US006744382B1

(12) United States Patent
Lapis et al.

(10) Patent No.: US 6,744,382 B1
(45) Date of Patent: Jun. 1, 2004

(54) METHOD AND APPARATUS FOR GUIDING AN AIRCRAFT THROUGH A CLUSTER OF HAZARDOUS AREAS

(75) Inventors: Mary Beth Lapis, Swisher, IA (US); Karen L. Walling, Cedar Rapids, IA (US); Kevin M. Kronfeld, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 220 days.

(21) Appl. No.: 10/126,803

(22) Filed: Apr. 19, 2002

(51) Int. Cl.[7] ............................................. G01C 23/00
(52) U.S. Cl. ..................... 340/971; 340/963; 701/200; 702/3; 342/26
(58) Field of Search ................... 340/971, 963; 701/200; 702/3, 4, 5; 342/26; 324/72

(56) References Cited

U.S. PATENT DOCUMENTS

| | | | | |
|---|---|---|---|---|
| 5,545,975 A | * | 8/1996 | Youngquist | .................. 324/72 |
| 5,757,322 A | * | 5/1998 | Ray et al. | ................... 342/460 |
| 6,043,756 A | | 3/2000 | Bateman et al. | ............. 340/945 |
| 6,501,392 B2 | * | 12/2002 | Gremmert et al. | .......... 340/971 |
| 6,542,825 B2 | * | 4/2003 | Jones et al. | ..................... 702/3 |
| 6,560,538 B2 | * | 5/2003 | Schwinn et al. | ............... 702/4 |
| 6,563,452 B1 | * | 5/2003 | Zheng et al. | ................. 342/26 |
| 6,597,305 B2 | * | 7/2003 | Szeto et al. | ................... 342/26 |

* cited by examiner

*Primary Examiner*—Nina Tong
(74) *Attorney, Agent, or Firm*—Nathan O. Jensen; Kyle Eppele

(57) ABSTRACT

An apparatus and method for displaying weather and other hazard information to a pilot with additional content which helps a pilot avoid no-fly-zones and to prepare a new flight path through a group of widely scattered thunderstorms. The display shows a no-fly-zone around the storm and the no-fly-zone is depicted differently, depending upon variables, such as distance from the aircraft, velocity of the storm being tracked and others.

20 Claims, 3 Drawing Sheets

METHOD AND APPARATUS FOR GUIDING AN AIRCRAFT THROUGH A CLUSTER OF HAZARDOUS AREAS

FIELD OF THE INVENTION

The present invention generally relates to avionics, and more particularly relates to hazard avoidance systems, and even more particularly relates to electronically providing a flight crew member with information relating to "no-fly zones" (NFZs), around dynamic hazards.

BACKGROUND OF THE INVENTION

In the past, designers of avionics displays and hazard avoidance systems have endeavored to achieve a reduction in pilot workload and/or an increase in safety of flight. One area of concern has been the avoidance of weather hazards along a flight path. Pilots have, in the past, received weather reports from ground-based weather services via data link, etc. These reports have typically been textual reports describing areas of predicted severe weather.

While these data-linked textual reports of predicted areas of severe weather have clear advantages, they also have significant drawbacks.

The cockpit can become, at times, a very busy place. For example, during times when weather forces a deviation from a predetermined flight plan, a pilot is often quite busy in avoiding the storm and determining a new flight plan. These problems are compounded when the storm being avoided is part of a widely scattered group of thunderstorms. The motion of the storms and the aircraft add complexity to the flight planning procedure. Avoiding a nearby storm may put the pilot on a new path, which could intercept one or more additional storms.

Consequently, there exists a need for improved methods and apparatuses for providing and displaying information to a flight crew member regarding predicted future dynamic hazards and their geographic limits.

SUMMARY OF THE INVENTION

It is an object of the present invention to provide an improved means for assisting a pilot with avoiding a group of dynamic hazards.

It is a feature of the present invention to utilize an improved weather radar display with NFZs shown disposed about hazard areas.

It is an advantage of the present invention to provide a representation of areas to avoid which are very quickly discernable to a busy pilot.

It is another feature of the present invention to include a representation of a predicted or future location of a storm cell and an avoidance zone about the predicted location of the storm.

It is another advantage of the present invention to provide for increased ability to develop a safe flight path through a group of storm cells.

It is yet another feature of the present invention to include variably sized NFZs, where the size of the NFZ is made larger as the radial distance between the hazard and the position of the aircraft increases.

It is yet another advantage of the present invention to provide for the capability of reducing pilot workloads at critical times, by permitting the pilot to better understand where storm cells may be at varying times in the future so as to avoid unwanted future interception.

It is still another feature of the present invention to provide a computer-generated display and autopilot controlled flight path through a group of storm cells.

It is still another advantage of the present invention to further reduce the pilot's workload by removing or reducing the effort required to determine a new flight path through a group of storm cells.

The present invention is an apparatus and method for aiding a flight crew member with navigating an aircraft through a group of storm cells, which apparatus and method are designed to satisfy the aforementioned needs, provide the previously stated objects, include the above-listed features, and achieve the already articulated advantages. The present invention is carried out in a "pilot speculation-less" manner in a sense that the undesirable levels of speculation by a pilot in determining current and prospective unsafe areas in which not to fly an aircraft, has been greatly reduced.

Accordingly, the present invention is a multi-mode weather radar/FMS/multi-function display, together, in some applications, with an autopilot system which simultaneously display NFZs for current dynamic hazards and/or provides a graphic representation of future fixed and variably sized NFZs for dynamic hazards located at variable ranges, as well as providing computer-generated flight paths and aircraft control along those flight paths.

BRIEF DESCRIPTION OF THE DRAWINGS

The invention may be more fully understood by reading the following description of the preferred embodiments of the invention, in conjunction with the appended drawing wherein.

DETAILED DESCRIPTION

Figure 1:
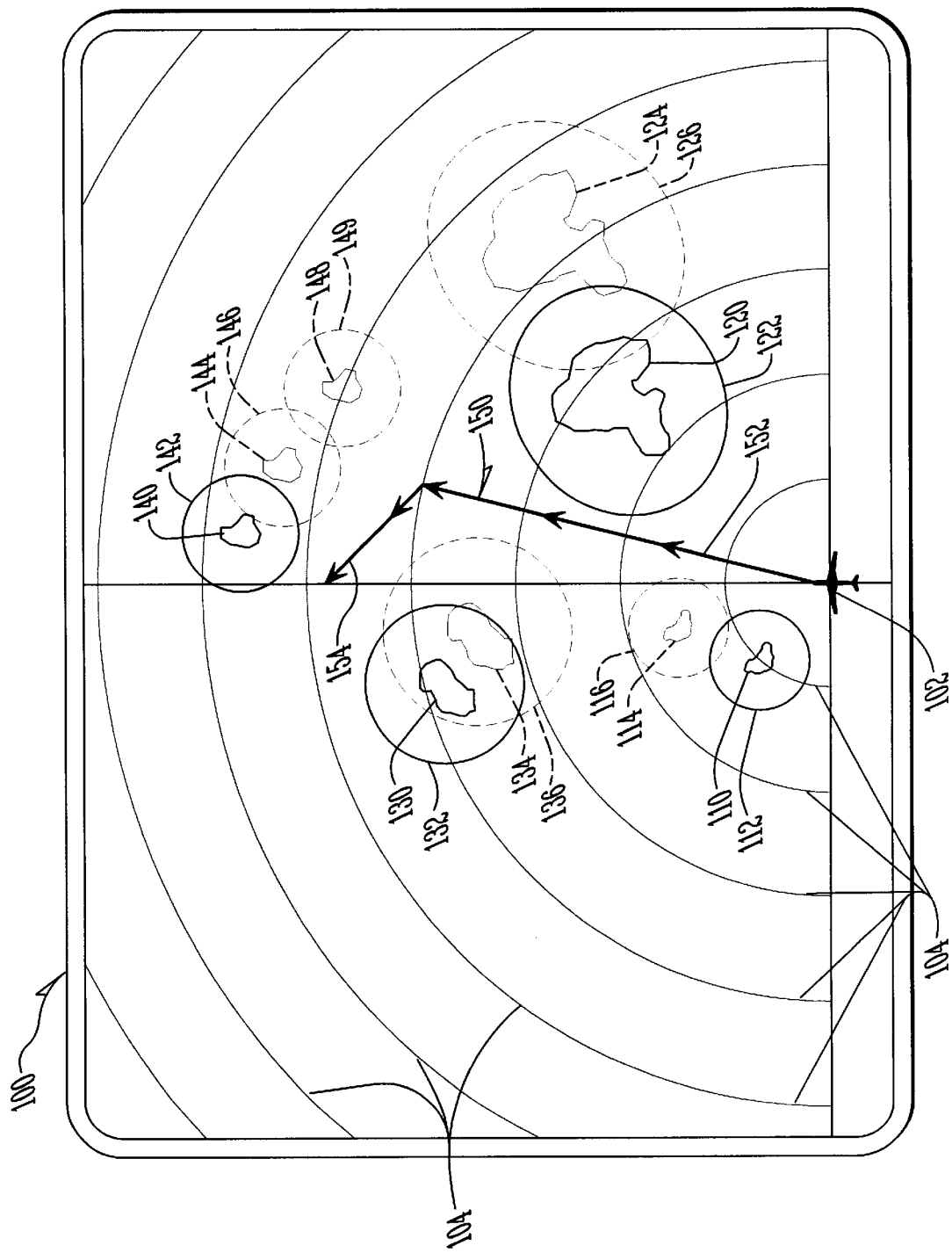
FIG. 1 is a simplified representation of a display of the present invention, wherein several storm cells are shown with NFZs around them. The dashed lines refer to projected locations of the storm cell and the projected location of the NFZs.

Now referring to the drawings wherein like numerals refer to like matter throughout, there is shown in FIG. 1 a display of the present invention, generally designated 100, having an aircraft 102 shown with a group of concentric iso-range lines 104. The display 100 is shown depicting a first storm cell current location 110 with a first storm cell current NFZ 112 disposed about it. First storm cell current NFZ 112 can be configured in many ways, including a polygon, an ellipse, a circle (ellipse with co-located foci) or other shapes. The NFZ will preferably be drawn with at least a 20-nautical mile (NM) buffer around the current location of the storm. In practice, the width of the avoidance zone varies with altitude, and to some extent with airline. Also, the avoidance zone can vary with height of storm: if a storm top is above the tropopause, flight crews avoid the storm by greater distances. Weather data has shown that there is probably good reason to give wide berth to very intense storms. A buffer of 15 NM is the rule of some U.S. airlines for flight above 30,000 ft. A preferred embodiment of the present invention may dictate a fixed buffer zone based in part on characteristics of the weather radar, and it could be 20 NM from the yellow (30 dBZ) contour of the storm. The first storm cell current location 110 is identified by the system of the present invention as being a storm cell to be tracked. It is given a temporary identification, and its movement is tracked over time so that predictions of future locations can be accomplished.

Second storm cell current location 120 is shown with a second storm cell current NFZ 122 disposed about it. Similarly, third storm cell current location 130 and fourth storm cell current location 140 are shown having third storm cell current NFZ 132 and fourth storm cell current NFZ 142, respectively, disposed thereabout. FIG. 1, with first storm cell current NFZ 112, second storm cell NFZ 122, third storm cell current NFZ 132, and fourth storm cell current NFZ 142, all make it easier for a pilot to determine locations which are currently undesirable. By viewing the storms shown in FIG. 1, and referring only to the first storm cell current NFZ 112, second storm cell current NFZ 122, third storm cell current NFZ 132, and fourth storm cell current NFZ 142 (the solid lined ellipses around the solid lined storms), a pilot might conclude that a slight deviation to the left or a bit larger deviation to the right might avoid the problem areas created by the displayed storms. However, such changes could result in an interception of either the first, the third, or the fourth storms at a future time. When the future locations of these storms are graphically provided, shown here by dashed lines, it becomes apparent that the above-mentioned maneuvers could result in an interception of a future NFZ to be associated with these storm cells. More specifically, there is shown a first storm cell future location 114 and a first storm cell future NFZ 116 about it. Similarly, there is shown a second storm cell future location 124 and a second storm cell future NFZ 126 which is further to the right. Third storm cell future location 134, together with third storm cell future NFZ 136, are shown having moved to the right such that they may be intercepted by a slight deviation of the flight path to the left. Fourth storm cell future location 144 and fourth storm cell future NFZ 146 depict the location of the fourth storm at a first future time period. Since fourth storm cell current NFZ 142 has a relatively longer radial distance from the aircraft 102, it will take more time for the aircraft 102 to approach its vicinity. Consequently, a fourth storm cell more distant future NFZ 149 is shown disposed around a fourth storm cell more distant future location 148. When fourth storm cell more distant future NFZ 149 is considered, it becomes more readily clear that a slight deviation of the flight plan to the right would not be advisable for an extended period.

A new flight path 150 is shown in which the aircraft 102 makes a turn to the right on leg 152 to avoid the first and the third storm cells. Then the pilot can return on leg 154 to the original flight path. This approach is particularly beneficial when accurate prediction of the velocity of storm cells is accomplished. However, storms cells can and do change direction and speed.

Figure 2:
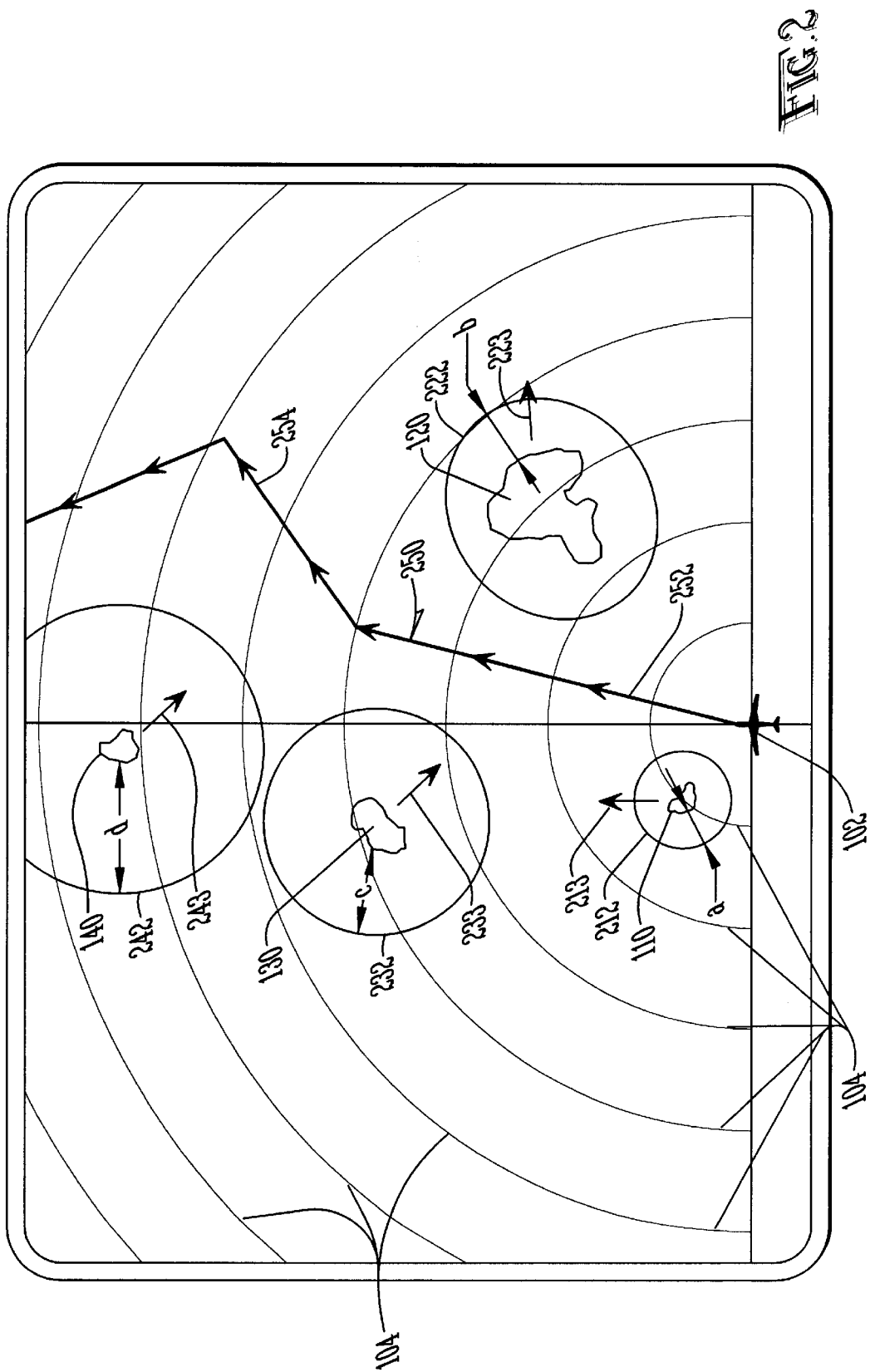
FIG. 2 is a simplified representation of an alternate display mode of the present invention, wherein the storm cells are provided with a velocity vector and a variably sized NFZ.

An alternate approach to displaying the trend information and the projected NFZs is depicted in FIG. 2. This method may be preferred to the method described in FIG. 1 when the necessary confidence in predicting future storm locations is lacking. Many other arrangements are also contemplated as well. The two methods described herein are intended to be examples of the many other variations which are intended to be within the scope of the claimed invention.

FIG. 2 includes first storm cell current location 110, second storm cell current location 120, third storm cell current location 130 and fourth storm cell current location 140; however, the NFZs are drawn differently in FIG. 2. First storm cell radial distance compensated NFZ 212 is shown with a vector 213 therein. Preferably, the buffer zone provided by an NFZ is larger the further a storm is from the aircraft 102. Consequently, the separation distance b between second storm cell current location 120 and second storm cell radial distance compensated NFZ 222 is larger than the separation distance a from first storm cell current location 110 to first storm cell radial distance compensated NFZ 212, because second storm cell current location 120 is located at a greater radial distance from the aircraft 102.

Similarly, fourth storm cell radial distance compensated NFZ 242 provides for a larger buffer zone (separation distance d) than the separation distance c of the third storm cell radial distance compensated NFZ 232 because of the greater radial distance to fourth storm cell current location 140. Vectors 213, 223, 233 and 243 may be provided to show the direction and velocity of the particular storm. The vectors may be made longer to represent their respective storm cells are traveling at a higher speed. In yet another embodiment, the NFZ could be envisioned as variable envelopes which are positioned about each of the storms, where the size, shape and orientation of the envelopes are a function of one or more of the relative locations and relative velocity of the storm with respect to the aircraft. The envelopes could have a third dimension, in which case they would be polyhedrons, or polyhedra. Size of envelopes might vary with assessed storm hazard. For example, it may be preferred to tag storm regions with a data block that contains information about maximum height, whether hail is likely, and the maximum intensity. One could advise a larger envelope for hail or storms contouring beyond 55 dBZ.

A computer-generated flight path 250 is shown in FIG. 2. It suggests that the pilot make a moderate angular deviation to the right shown by leg 252, followed by a second larger angular deviation to the right, shown by leg 254. This second deviation occurs after the aircraft 102 reaches an area between the second, third and fourth storms.

When planning a deviation, the pilot might use a "direct-to" to create an alternate flight plan, direct to a waypoint. Usually the alternate flight plan is shown as a dashed line on the display. The pilot would maneuver the aircraft or manipulate the flight plan until the proposed alternate flight plan cleared all the envelopes of the storms; then the pilot would execute the proposed alternate flight plan.

The present invention is believed to be very beneficial as a system for use in the commercial air transport markets. As such, it could be combined with various well-known air transport avionics equipment.

Figure 3:
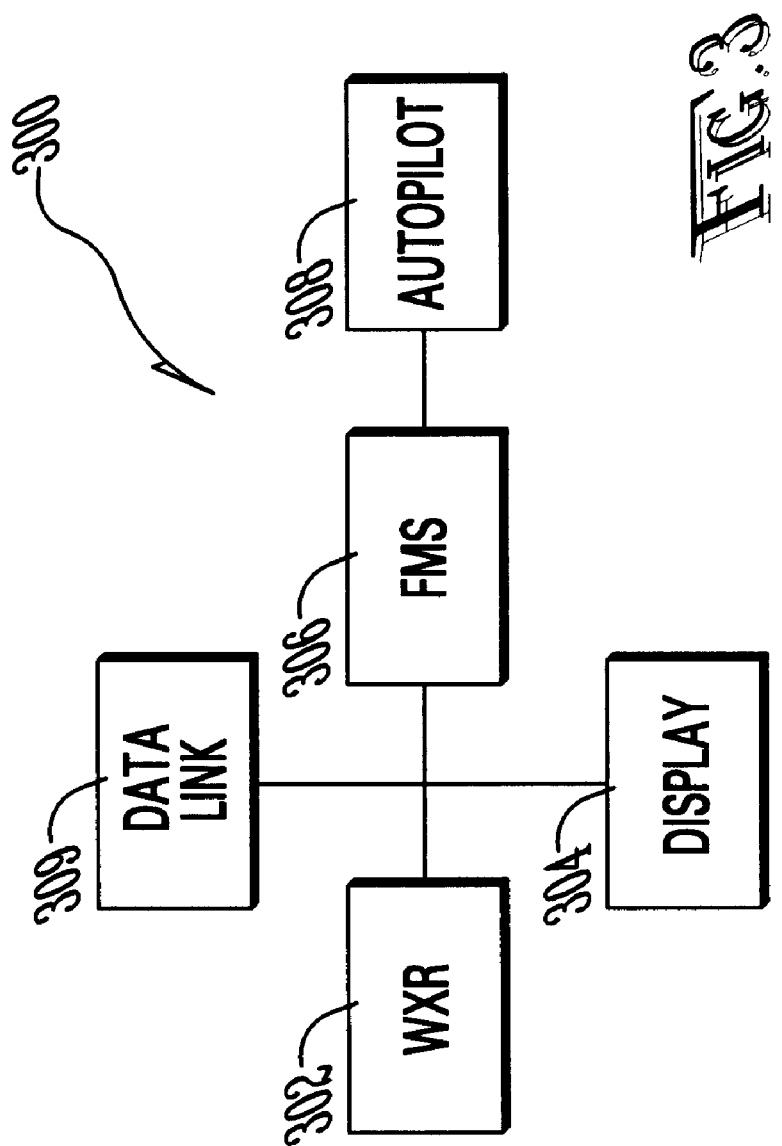
FIG. 3 is a simplified block diagram view of a system of the present invention.

Now referring to FIG. 3, there is shown one possible implementation of a system of the present invention generally designated 300. The system 300 may include some or all of these components and more. For example, weather radar system 302 could be used to survey the area for severe weather, and the weather radar system 302 could be directly or indirectly coupled to flight management system 306. The storm information could be provided by means other than the weather radar system 302. Weather information is currently available from ground-based sources, such as NEXRAD radar facilities and other services, such as those supported by the U.S. government to track storms over the continental United States. This information could be "data linked" (sent via a data link radio) to the pilot and the on-board avionics by data link system 309. The autopilot system 308, data link system 309 and cockpit display 304 could all be connected as well. The interconnections between these avionics boxes are, of course, shown in a simplified manner. It should be understood that the processing of the method of the present invention could be done in any one of the above avionics boxes. It could be in a separate dedicated box, or it could be distributed among them and other avionics equipment on the aircraft.

In some situations, there may not be a data link system 309; in others, the autopilot system 308 might be omitted. In still others, the cockpit display 304 could be missing. One potential use for the present invention is to provide a serviceman with a display from which to command a fleet of unmanned aerial vehicles (UAVs). In such situations, the cockpit display 304 would obviously not be on the UAV, but at a command and control base. An autopilot system 308 and a data link system 309 would likely be included. The present invention is intended to encompass many different variations of the present invention.

Throughout the description the term "no-fly zone" has been used repeatedly. It should be understood that the term "no-fly zone" is not necessarily an absolute prohibition. Instead, these terms should be read to include a notion of a buffer zone or a zone to be avoided, extending in some cases beyond the displayed contours of the weather hazard.

Throughout this description, the terms "pilot" and "flight crew" have been used. They are selected because they are believed to readily convey the present invention; however, it should be understood that other persons, other than on-board personnel, could be substituted, and dynamic hazards other than weather, such as areas of severe turbulence or a dispersing cloud of volcanic ash, could be substituted as well. It is intended that the present invention could be applicable to vessels at sea, as well as to aircraft. It is intended that the present invention and the claims below be read to include all variations of these concepts. The designs shown and described above are merely exemplary of many other designs which could be used with the present invention.

The hardware and software to create the displays of the present invention are either well known in the art, or could be adapted, without undue experimentation, from well-known hardware and software, by persons having ordinary skill in the art, once they have carefully reviewed the description of the present invention included herein.

It is thought that the method and apparatus of the present invention will be understood from the foregoing description and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

We claim:

1. An avionics system comprising:
    a display showing a plurality of dynamic hazards disposed around a central point depicting a current location of an aircraft, where increased distance on the display corresponds to increased separation between a dynamic hazard and the aircraft; and,
    a line drawn around each of said plurality of dynamic hazards to create a no-fly-zone;
    WHEREBY, a flight crew member on said aircraft can readily see areas which are to be avoided.

2. An avionics system of claim 1 wherein said line is drawn such as to represent a no-fly-zone which is at least large enough to include airspace within a predetermined minimum safe separation distance from a dynamic hazard.

3. An avionics system of claim 2 wherein each of said plurality of dynamic hazards is a storm cell, and said predetermined minimum safe separation distance is nominally 20 NM.

4. An avionics system of claim 2 wherein said plurality of dynamic hazards are weather-related hazards and further comprising:
    additional graphic representation providing information relating to a predicted future contour of a tracked storm cell.

5. An avionics system of claim 4 wherein said additional graphic representation is predicted future no-fly-zone.

6. An avionics system of claim 5 wherein said predicted future no-fly-zone is disposed around a predicted future contour of said tracked storm cell.

7. An avionics system of claim 2 wherein a size characteristic of said no-fly-zone is determined by a separation distance between a tracked storm cell and a location of the aircraft.

8. An avionics system of claim 7 further comprising a displayed vector depicting predicted future movement of said tracked storm cell.

9. An avionics system of claim 8 wherein a length characteristic of said displayed vector represents a speed characteristic of said tracked storm cell.

10. An avionics system of claim 9 further including a display of an automated deviated flight path which avoids said tracked storm cell.

11. A method of assisting a pilot with navigating an aircraft through a plurality of dynamic hazards, the method comprising the steps of:
    providing a map display of weather information;
    providing a display of a zone line drawn around a dynamic hazard, where the zone line represents airspace within a predetermined distance of said dynamic hazard.

12. A method of claim 11 wherein said dynamic hazard is a contoured region within a storm.

13. A method of claim 12 wherein said contoured region is tracked to predict a future location.

14. A method of claim 13 further including the step of providing a future zone line disposed about said predicted future location.

15. A method of claim 12 wherein said storm cell is a tracked storm cell having a predicted future velocity.

16. A method of claim 15 wherein said predetermined distance is variable and is, at least in part, related to a radial distance from said tracked storm cell to said aircraft.

17. A method of claim 16 further comprising the step of:
    providing a display of a velocity vector of said tracked storm cell, where a length characteristic of said velocity vector corresponds to a relative speed characteristic between said aircraft and said tracked storm cell.

18. A method of claim 17 further comprising the steps of:
    automatically generating an alternate flight path of said aircraft in response to said tracked storm cell and automatically flying said aircraft along said alternate flight path.

19. A method of claim 17 wherein said step of providing a display of a zone line is performed at a location other than on said aircraft; and said aircraft is an unmanned aerial vehicle.

20. A system comprising:
    means for providing and processing weather information;
    means for displaying said weather information on-board an aircraft;

wherein said means for providing and processing weather information being configured to determine a no-fly-zone around a tracked storm cell;

wherein said no-fly-zone is sized, shaped, located and oriented in response to a size characteristic of said tracked storm cell, a velocity characteristic of said tracked storm cell, and a separation distance between said tracked storm cell and said aircraft; and, means for generating an alternate flight path of said aircraft in response to said tracked storm cell.

* * * * *